United States Patent [19]
Itoh et al.

[11] Patent Number: 4,552,605
[45] Date of Patent: Nov. 12, 1985

[54] UTILIZING PARTICULATE ADHESIVE FOR LAMINATING PLASTIC FILM TO THE SURFACE OF METAL

[75] Inventors: Senji Itoh, Ayase; Toshifumi Tanabashi, Yokohama; Kazuhisa Ishibashi, Tokyo, all of Japan

[73] Assignee: Toyo Seikan Kaisha Limited, Tokyo, Japan

[21] Appl. No.: 292,186

[22] Filed: Aug. 12, 1981

Related U.S. Application Data

[63] Continuation of Ser. No. 57,671, Jul. 16, 1979, abandoned.

[30] Foreign Application Priority Data

Jul. 17, 1978 [JP] Japan ................... 53-86044
May 7, 1979 [JP] Japan ................... 54-54707

[51] Int. Cl.$^4$ ............... B32B 31/06; B32B 31/08; B32B 31/12; B32B 31/28
[52] U.S. Cl. ............... 156/273.3; 156/275.7; 156/283; 156/309.9; 156/311; 156/324; 156/555; 428/339; 428/341; 428/461
[58] Field of Search ............... 156/283, 244.11, 272, 156/308.6, 309.9, 324, 272.4, 273.9, 275.7, 311, 555; 219/10.43; 428/461, 339, 341; 427/195

[56] References Cited

U.S. PATENT DOCUMENTS

| 3,514,308 | 5/1970 | Scott et al. | 428/461 |
| 3,582,427 | 6/1971 | Bacskai | 156/283 |
| 3,769,137 | 10/1973 | Moriyama et al. | 156/324 |
| 3,775,239 | 11/1973 | Snow | 156/244.11 |
| 3,808,074 | 4/1974 | Smith et al. | 219/10.43 |
| 4,096,309 | 6/1978 | Stillman | 428/461 |
| 4,172,912 | 10/1979 | Noji et al. | 427/195 |
| 4,172,914 | 10/1979 | Festag et al. | 428/339 |

FOREIGN PATENT DOCUMENTS 50-53483 12/1975 Japan ................... 156/283

Primary Examiner—Jerome Massie
Attorney, Agent, or Firm—Wenderoth, Lind & Ponack

[57] ABSTRACT

In a method for laminating a film of a synthetic resin to the surface of a base metal, the improvement which comprises coating an adhesive synthetic resin powder either as such or as a dispersion in water or in a low-boiling organic liquid on said metal surface and heating the coating to melt the powder, or directly coating said synthetic resin powder in the molten state on said metal surface, thereby to bond the synthetic resin powder thereto, superposing said film of synthetic resin on the resulting coating, heating the assembly under pressure, and then cooling the resulting laminate.

6 Claims, 8 Drawing Figures

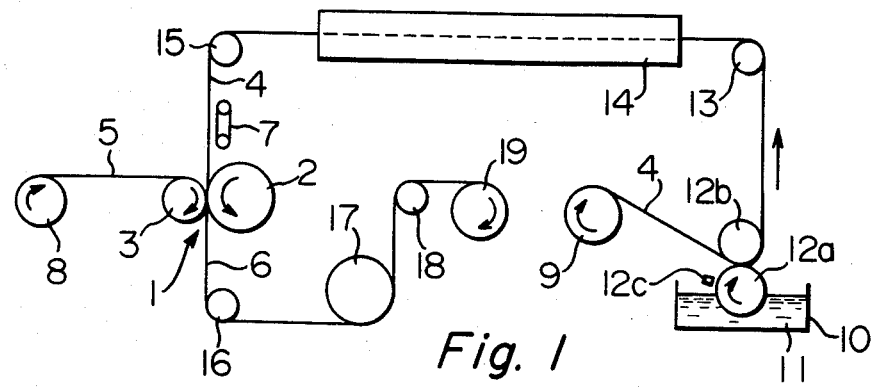
Fig. 1
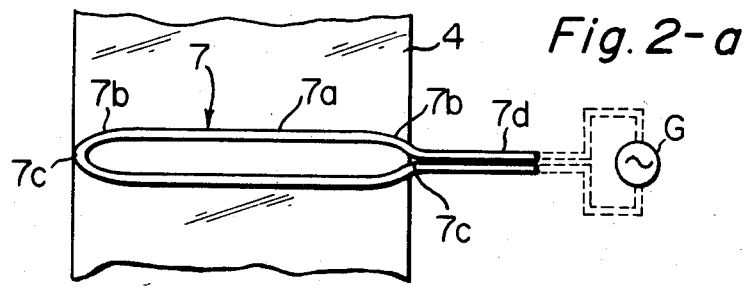
Fig. 2-a
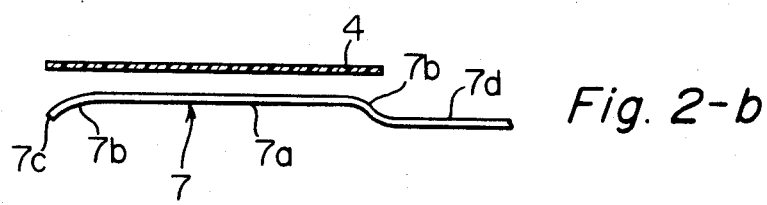
Fig. 2-b
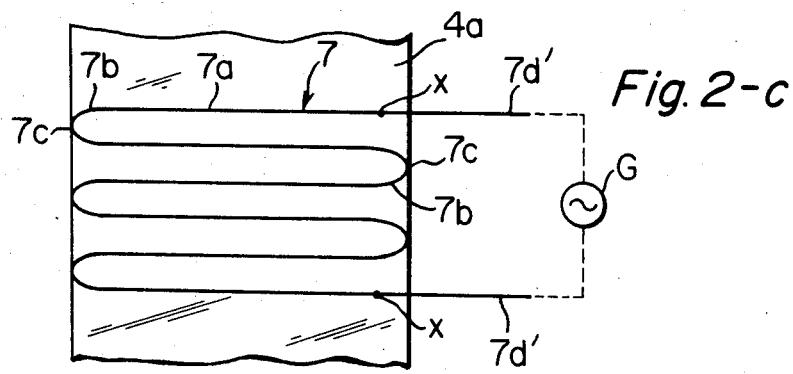
Fig. 2-c

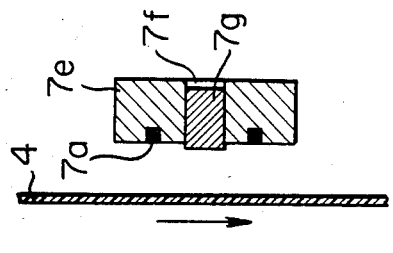
Fig. 3-b
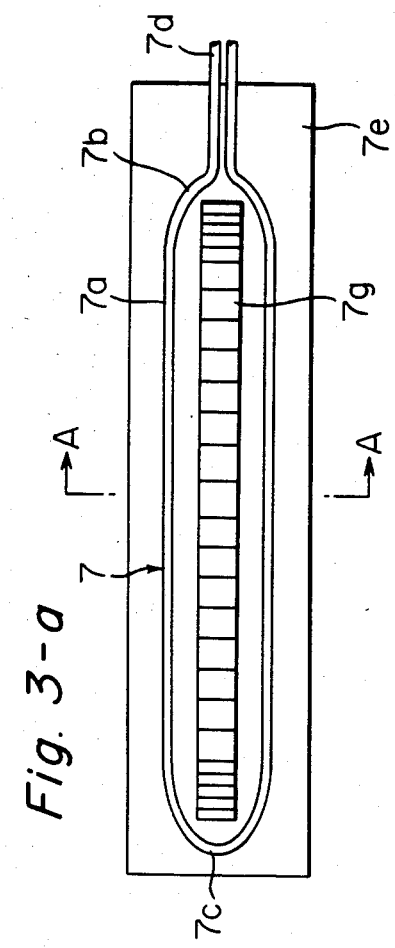
Fig. 3-a
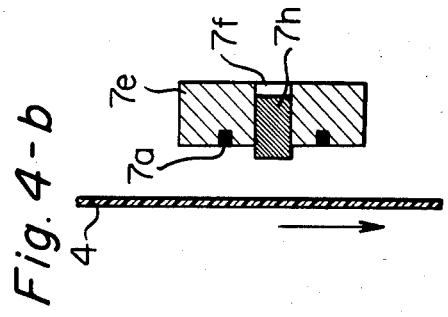
Fig. 4-b
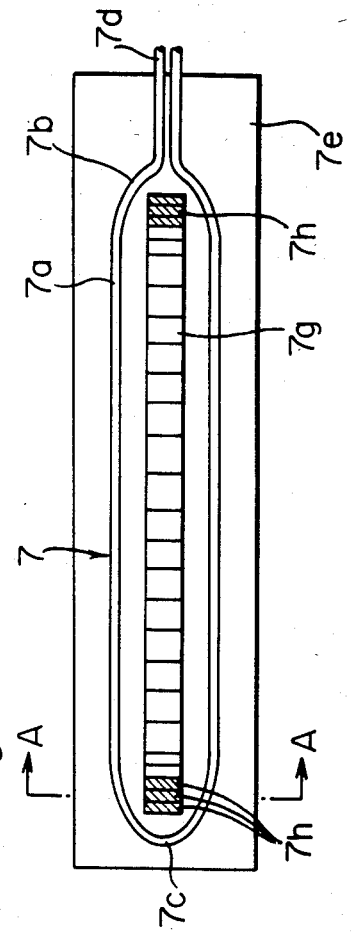
Fig. 4-a

UTILIZING PARTICULATE ADHESIVE FOR LAMINATING PLASTIC FILM TO THE SURFACE OF METAL

This application is a continuation of Ser. No. 57,671, filed July 16, 1979, now abandoned.

This invention relates to an improvement in a method for laminating a plastic film to metal, and more specifically, to a method for producing a three-layer laminated film for food packaging, comprising two surface layers of plastic film and an interlayer of a metal foil.

Three-layer laminated sheets comprising an interlayer of a metal foil and two surface layers of plastic film are known, and used for packaging, interior decoration, the production of bags, etc. In particular, laminated sheets of this structure in which one surface layer is composed of a heat-sealable crystalline olefinic resin suitable for contact with foods, and the other surface layer is composed of a thermally stable resin such as polyethylene terephthalate, are extensively used as food packaging pouches which can permit heat sterilization of foods while including and sealing them therein.

In the production of the three-layer laminated sheets, the adhesion between the metal foil and the plastic film, especially the adhesion between the metal foil and the cyrstalline olefinic resin used as a foodcontacting layer in heat-sterilizable food packaging pouches, is one important problem.

It has been the previous practice to use an isocyanate-type or vinylidene chloride-type adhesive for bonding a plastic film to metal foil. The individual layers having the above adhesive applied to their bonding surfaces are laminated, and bonded under pressure by a roll bonding method, etc. through the adhesive at a temperature lower than about 100° C.

Although the isocyanate-type adhesive has the excellent characteristic that the bonded layer will not be peeled or degraded even when subjected to high temperature retort sterilization at more than about 120° C., it requires a troublesome step of curing at about 50° C. for about a week after formation of the laminated structure, and furthermore, poses some hygienic problems. On the other hand, the vinylidene chloride-type adhesive has the defect that the bonded layer is peeled off by the high temperature retort sterilization treatment, and the laminate obtained by using this adhesive is limited in use.

The use of a dispersion of maleic anhydridemodified polypropylene in a high-boiling organic solvent instead of the isocyanate-type or vinylidene chloride-type adhesive was suggested (Japanese Laid-Open Patent Publication No. 84088/78). According to the method disclosed in this Japanese Patent Publication, a plastic film (first layer) is bonded to one surface of a metal foil. The resulting two-layer sheet is used as a base, and another layer of plastic film (third layer) is bonded to the metal foil (second layer) surface of the two-layer sheet. At this time, the two-layer base sheet having the adhesive applied to the metal foil surface is heated to a temperature above about 200° C. for a fairly long period of time, for example a period longer than 10 seconds, to remove the solvent and melt the modified polypropylene. Heating at such a high temperature for a long time adversely affects the bonding of the metal foil to the plastic film (first layer) in the two-layer base sheet. Furthermore, the adhesion between the metal foil and the plastic film of the third layer is also unsatisfactory. When the resulting laminated structure is used as a heat-sterilizable food packaging pouch, and subjected to heat sterilization after packing a food therein, spot-like peeling occurs between the layers, and may cause pinholes.

It is an object of this invention therefore to provide a method for laminating a metal foil to a plastic film with superior adhesion without causing hygienic toxicity.

Another object of this invention is to provide a method for bonding a third layer of a plastic film to the metal foil surface of a two-layer sheet composed of a plastic film and a metal foil without impairing the adhesion of the two-layer sheet.

A specific object of this invention is to provide a three-layer laminate sheet of plastic film-metal foil-plastic film which is hygienically non-toxic, has superior adhesion among the individual layers, and which is suitable for the production of heat-sterilizable food packaging pouches.

The above objects of the invention are achieved by an improved method for laminating a film of a synthetic resin to the surface of a base metal, wherein the improvement comprises coating an adhesive synthetic resin powder either as such or as a dispersion in water or in a low-boiling organic liquid on said metal surface and heating the coating to melt the powder, or directly coating said synthetic resin powder in the molten state on said metal surface, thereby to bond the synthetic resin powder thereto, superposing said film of synthetic resin on the resulting coating, heating the assembly under pressure, and then cooling the resulting laminate.

The adhesive synthetic resin powder used in the method of this invention denotes a normally solid particulate polymer having a particle diameter of 0.1 to 200 microns, preferably 0.1 to 100 microns, and containing in the molecule a functional group such as a carboxyl, hydroxyl, amide, acid anhydride, ester, urea or urethane group.

Examples of suitable adhesive synthetic resins for use in this invention include modified olefinic resins such as modified polypropylene, modified ethylene/propylene copolymer and modified poly-4-methylpentene-1 obtained by modifying olefinic resins with organic acids such as maleic acid, fumaric acid, crotonic acid, itaconic acid, citraconic acid or acrylic acid, esters or metal salts of such organic acids, or acid anhydrides such as maleic anhydride, citraconic anhydride or tetrahydrophthalic anhydride by graft, block or random copolymerization; mixtures of said modified olefinic resins with unmodified olefinic resins; and other resins such as nylon 6, nylon 66, nylon 11, nylon 12, copolymerized nylon resins based on these nylon resins, epoxy resins, polyester resins, polyester ether resins, and fluorocarbon resins.

The adhesive synthetic resin powder can be coated on, and adhered to, the surface of a base metal in the form of a solid powder without using any liquid medium. Electrostatic coating methods such as electrostatic spraying or electrostatic fluidized bed method are most desirable methods of coating. It is also possible to simply spray the resin powder onto the metal surface.

If desired, the adhesive synthetic resin powder may be dispersed in water or a low-boiling organic liquid, and the resulting dispersion may be coated on the base metal surface, followed by evaporating the water or the organic liquid, thereby adhering the resin powder to the metal surface.

The low-boiling organic liquids used in the production of the dispersion are organic liquids having a boiling point in the range of 50° to 112° C., such as toluene, ethyl acetate, methyl ethyl ketone, acetone, methanol, ethanol, ethyl formate, cyclohexane, hexane, and heptane.

The resin powder content of the dispersion is generally in the range of 5 to 30% by weight, preferably 10 to 20% by weight. The dispersion can be prepared in a customary manner used in the production of dispersions.

The dispersion is coated on the metal surface by ordinary coating methods such as gravure roll coating or smooth roll coating, and the coated article is then heated to a relatively low temperature of, say, 80° to 120° C., in a hot air oven, for example, whereby the water or organic liquid medium is evaporated off.

The suitable amount of the adhesive synthetic resin powder adhering to the base metal surface is 0.1 to 10 g/m$^2$, preferably 1.0 to 5.0 g/m$^2$.

The applied adhesive synthetic resin powder is then heated to a temperature above its melting point, preferably to a temperature 10°–100° C. higher than its melting point.

Instead of coating a solid powder of the adhesive synthetic resin and then melting the coating, the resin may be coated in the form of a molten powder by using a flame spraying method.

A film of a synthetic resin which is adhesive to the adhesive synthetic resin is then laminated to the coated layer of the adhesive synthetic resin formed on one surface of the base metal, preferably to the molten coated layer, preferably by melt extrusion, and then bonded under heat and pressure to obtain the desired laminate.

Examples of synthetic resin films are films having a thickness of 30 to 150 microns, preferably 50 to 80 microns, of polyethylene, polypropylene, ethylene/propylene random or block copolymer, poly-4-methylpentene-1, nylon 6, nylon 66, nylon 11, nylon 12, copolymerized nylons based on these nylons, polyethylene terephthalate, polybutylene terephthalate, polyethylene isophthalate, copolyesters based on these polyesters, polyester ethers, and fluorocarbon resins.

The temperature and pressure for bonding the plastic film should be selected properly depending upon the type of the synthetic resin which constitutes the film. Generally, temperatures of 150° to 350° C., preferably 180° to 300° C., and pressures of 0.5 to 30 kg/cm$^2$, preferably 1 to 10 kg/cm$^2$, are employed.

The base metal used in this invention includes, for example, aluminum, copper, iron, zinc, tin, or chromate-treated iron and is preferably in the form of a foil. A two-layer laminate obtained by bonding a thermally stable synthetic resin such as polyethylene terephthalate, nylon 6, nylon 66, polytetrafluoroethylene or polyimide to one surface of the metal foil by means of an adhesive, and a coated metal foil obtained by coating one surface of the metal foil with a baking paint composed of a thermosetting resin such as epoxy resins, silicone resins, epoxy phenol resins, alkyd resins or polyimide resins, followed by baking, can be used. By using such a base metal, a three-layer laminate sheet comprising two surface layers of the plastic films and an interlayer of the metal foil can be obtained. The plastic films as the surface layers may be the same or different in kind.

The method of this invention described hereinafter is especially suitable for the production of a three-layer laminate sheet used for heat-sterilizable food packaging pouches by laminating a film of a crystalline polyolefin resin such as polyethylene, polypropylene, ethylene/propylene random or block copolymer, or poly-4-methylpentene-1 on the metal foil surface of a two-layer laminate sheet composed of a metal foil, especially an aluminum foil, and a thermally stable synthetic resin film such as a polyethylene terephthalate film. When the laminate sheet is to be produced by using a polypropylene film as an inside layer of a pouch, it is preferred to use as the adhesive resin a powder of maleic acid-modified polypropylene having an average molecular weight corresponding to an intrinsic viscosity, measured at 135° C. in decalin, of 0.5 to 2.2.

The two-layer sheet composed of a metal foil and a thermally stable synthetic resin used in the production of such a three-layer laminate sheet is preferably one produced by laminating a thermally stable synthetic resin film having a thickness of 3 to 30 microns, preferably 5 to 15 microns, to a metal foil having a thickness of 5 to 30 microns, preferably 7 to 12 microns, by means of an adhesive of the isocyanate or epoxy-isocyanate type. The film of crystalline polyolefin is laminated on the metal foil surface of this laminated sheet by the method of this invention. It is important in this case that the heating of the adhesive synthetic resin powder applied to the metal foil surface of the two-layer laminate sheet should be performed within very short periods of time of, say, 0.1 to 10 seconds, preferably 0.1 to 3 seconds, so as not to reduce the adhesion between the metal foil and the thermally stable synthetic resin film in the two-layer laminate sheet. The best method for achieving this heating is to heat the surface of the metal foil to 150° to 350° C., preferably 180° to 250° C., by high frequency induction heating for the short period specified above.

In the above embodiment, lamination of plastic films as the first and third layers to the metal foil (second layer) may be performed in the reverse order. For example, a two-layer film is prepared by coating the adhesive resin powder on one surface of the metal foil, melting the coating, and heat bonding a plastic film, which is adhesive to the adhesive synthetic resin powder, to the coating. Then, the thermally stable resin can be laminated to the metal foil surface of the two-layer film by means of an isocyanate adhesive. Instead of using the isocyanate-type adhesive, the metal foil and the thermally stable resin film may be bonded by using an adhesive powder which is adhesive to the thermally stable resin film.

The method of laminating the crystalline polyolefin film (to be referred to as a second web) to a metal foil or a two-layer metal foil having a thermally stable synthetic resin film bonded thereto (to be referred to as a first web), and an example of an apparatus for use in the method are described below with reference to the accompanying drawings in which:

FIG. 1 is a simplified side elevation of an apparatus used in the performance of the present invention;

FIGS. 2-a and 2-b are a front elevation and a top plan, respectively, of a high frequency induction heating coil suitable for the practice of this invention;

FIG. 2-c is a front elevation of a high frequency induction heating coil suitable for heating a web moving at a high speed;

FIGS. 3-a and 3-b are a front elevation and cross-sectional view of one example of a high frequency induction heating coil device suitable for the practice of this invention; and FIGS. 4-*a* and 4-*b* are a front elevation and a cross sectional view of another embodiment of a high frequency induction heating coil device suitable for the practice of this invention.

Referring to FIG. 1, a heat-melting roll 1 consists of a set of a heating roll 2 and a press roll 3, and the distance between the centers of the two rolls is adjustable. The heating roll 2 includes an electric heater adapted to raise the temperature of the roll surface to 140° C. to about 350° C. The surface of the heating roll is coated with Teflon or a bright chrome coating formed by electroplating. If desired, a drive device is provided in the heating roll 2. The press roll 3 is lined with elastic rubber, and serves to heatbond a web 4, having an adhesive synthetic resin powder melt-adhered thereto, to a web 5 under elastic pressure in cooperation with the heating roll 2 to produce a laminated structure 6.

When the first web 4 is a laminate of a thermally stable synthetic resin film and a metal foil, the metal foil side is located usually on the side of the press roll 3, and the plastic film side is located on the side of the heating roll 2. That side of the metal foil which faces the press roll 3 may be coated with an adhesive synthetic resin powder for heat bonding the second web 5. The first web passes straight through the gap in the heat bonding roll 1 without forming a wrapping angle with the heating roll 2. The second web 5 is unwound from an unwinding reel 8 and passes through the heat bonding roll 1 while forming a wrapping angle with the press roll 3.

The reference numeral 7 represents a high frequency induction heating coil provided adjacent the first web 4 immediately above the heating roll 2, which is of the structure shown, for example, in FIGS. 2-*a* and 2-*b* so as to heat the first web 4 substantially uniformly in its transverse direction. The heating coil 7 may be provided on either side of the first web.

FIG. 2-*a* is a front elevation of the high frequency induction heating coil seen from the direction of the heating roll 2, and FIG. 2-*b* is a top plan thereof. The high frequency heating coil 7 consists of a pair of parallel portions 7*a* spaced from each other a predetermined distance and being parallel to the first web 4 and normal to its advancing direction, and curved portions 7*b* at both ends. It is connected to a high frequency power source G through a feeder 7*d* extending from one end of the curved portion 7*b*. The curved portion 7*b* is spaced a larger distance from the web 4 as it approaches the forward end 7*c*. The gradient of the distance between the position of the forward end 7*c* and the web 4 is determined so that the temperature of the end portion of the web is substantially equal to the temperature of the central portion of the web, and thus, a substantially uniform temperature distribution can be obtained over the widthwise direction of the web. Preferably, the forward end 7*c* is located on a plane passing the end portion of the web and being normal to the web, or slightly inwardly of it. If it is outwardly of the plane normal to the web, it is likely that an excessively high induced current will flow through the end portion of the web to overheat it. As the distance between the forward end 7*c* and the web approaches the distance between the parallel portions 7*a* and the web, the end portion of the web is more liable to be overheated. Conversely, if the distance between the forward end 7*c* and the web is too large, a temperature rise in the end portion of the web is reduced, and it is difficult to heat the web uniformly in the widthwise direction.

In the above description, the coil is of one turn. If the running speed of the web is high, it is desirable to use a coil of several turns as shown in FIG. 2-*c* in order to increase the ability of heating. In this case, a feeder 7*d'* leading to the high frequency power source needs to be moved away from the web starting at a suitable position x inwardly of the end portion 4*a* of the web. The high frequency heating coil 7 is maintained at a predetermined position by a support (of the type shown in FIG. 3) made of Bakelite, ferrite, etc.

FIGS. 3-*a* and 3-*b* show one example of a high frequency induction heating coil device which can adjust the temperature distribution of the first web in the widthwise direction, and FIGS. 4-*a* and 4-*b* show another example of the high frequency induction heating coil device.

FIGS. 3-*a* and 4-*a* are front elevations of the induction heating coil device seen from the side of the first web 4, and FIGS. 3-*b* and 4-*b* are sectional views of the device taken along the lines A—A of FIGS. 3-*a* and 4-*a*.

The same reference numerals as those in FIGS. 2-*a* and 2-*b* of the heating coil 7 show the same parts. The heating coil 7 is supported in a supporting plate 7*e* composed of an electric insulator such as Bakelite. An aperture 7*f* whose longitudinal direction matches the transverse direction of the first web 4 is provided at that position of the support plate 7*e* which is inwardly of the heating coil 7. Within the aperture 7*f* are disposed a plurality of ferrite pieces 7*g*, which are a highly magnetically permeable material, in such a manner that the ferrite pieces 7*g* approach the first web, the degree of coupling between the first web and the heating coil increases, and the temperature of the aforesaid approaching portion of the first web becomes higher. Accordingly, by adjusting the distance between the first web and each of the ferrite pieces 7*g*, the temperature distribution of the first web in its transverse direction can be easily maintained uniform. By employing this method of control, a substantially uniform temperature distribution over the entire width of the web including its end portions can be maintained without varying the profiles of the curved portions 7*b* and 7*c* on a trial-and-error basis.

The temperature distribution can also be controlled by using a highly conductive material such as copper pieces instead of a highly magnetically permeable material such as ferrite pieces. The temperature distribution can similarly be controlled by using both the highly conductive material and the highly magnetically permeable material.

The device shown in FIGS. 4-*a* and 4-*b* is a modification of the device shown in FIGS. 3-*a* and 3*b*, in which copper pieces 7*h* are substituted for several ferrite pieces at both end portions (i.e., both the ferrite pieces and copper pieces are used) to facilitate the adjustment of the heating temperature. In this device, the temperature rise of that portion of the web which faces the portion having attached thereto a ferrite core increases, and the temperature rise of that portion of the web which faces the portion having the copper plate secured thereto is reduced. As a result, the temperature distribution can be freely controlled.

The first web 4 is sent to an applicator for the adhesive synthetic resin powder by an unwinding reel 9. The adhesive synthetic resin powder, either as such (i.e., without using any liquid medium), or as a dispersion in water or a low-boiling organic liquid, is applied to the metal foil surface of the web 4. FIG. 1 shows an example in which it is applied as a dispersion. Thus, the applicator consists of a tank 10 containing a bath 11 of dispersion of the adhesive synthetic resin powder in a low-boiling organic solvent, a coating roll composed of a gravure metallic roll 12a and a rubber-lined roll 12b, and a doctor knife 12c. Gravure metallic roll 12a is disposed such that its lower portion is partly dipped in the adhesive bath 11. The first web 4 passes through the space between the metallic roll 12a and the rubber-lined roll 12b, and at this time, is coated with the adhesive powder together with a solvent therefor at its undersurface. The amount of the adhesive coated is adjusted by the doctor knife 12c. Then, the first web 4 is conducted to a horizontal oven 14 via a deflector roll 13. It is heated in the oven to a temperature of about 50° to about 110° C., and the adhering solvent is evaporated off. Then, the first web, coated with the powdery adhesive on one of its surfaces (the metal foil surface), is led to the high frequency induction heating coil 7, and heated. Then, the second web is laminated to it by the heat bonding roll 1.

The reference numeral 17 represents a cooling roll for cooling the heat-bonded laminate 6 supplied via a deflector roll 16. The reference numeral 18 represents another deflector roll, and 19, a wind-up reel for the laminated structure 6. When the running speed of the web is high, provision of a plurality of heat bonding rolls is recommended, and immediately before the second web passes the space in the heat bonding roll 1, the adhesive synthetic resin coated on the metal foil surface is heated by the high frequency heating coil 7 and thus melted.

A method for producing a laminate by using the webs and the apparatus described hereinabove is explained below.

The first web 4 is unwound from the reel 9, and the second web 5, from the reel 8. There webs are laminated after they have gone through the steps shown in FIG. 1, and then wound up on a reel 19 under slight tension. As stated hereinabove, the first web 4 is coated at its metal foil surface with the adhesive powder together with a solvent therefor by means of rolls 12a and 12b, and then treated in the oven 14 to remove the solvent. The metal foil of the first web is substantially rapidly heated in the transverse direction at a position facing the high frequency induction heating coil 7 to a temperature of at least 150° C., preferably to a temperature substantially equal to, or slightly higher, than the surface temperature of the heating roll 2, in order to prevent the occurrence of longitudinal creases in the laminate 6. Simultaneously, the adhesive synthetic resin powder coated on the metal foil surface is melted to form a coating of the adhesive. As soon as the first web comes near a position facing the uppermost conductor wire of the high frequency heating coil 7, its rapid heating begins, and when it comes near a position facing the lowermost conductor wire (i.e., perpendicular projected line), its heating ends. From then to the time when the web enters the space between the heating roll 2 and the press roll 3, some temperature decrease occurs. The best result in preventing longitudinal creases is obtained when the temperature of the metal foil, upon entering of the first web into this space, is substantially equal to the surface temperature of the heating roll 2. The reason for this is not entirely clear, but is presumably associated with the fact that when the difference between the temperature of the metal foil and that of the heating roll is large, the metal foil in the nipped state, upon entering of the first web into the space between the rolls 2 and 3, abruptly expands or shrinks under heat (especially in the transverse direction) to generate flexure.

The time which elapses from the time when the first web reaches a position facing the lowermost conductor wire of the high frequency heating coil to the time when it enters the space between rolls 2 and 3 is desirably not more than about 5 seconds, preferably less than 1 second. If the time is longer than about 5 seconds, creases tend to occur in the laminate 6. The reason for this is not clear, but is presumably ascribed to the fact that when this time is longer than about 5 seconds, the metal foil is cooled before the first web enters the space between rolls 2 and 3 after leaving the high frequency induction heating section, thus increasing the temperature gradient of the web in its longitudinal direction.

The first web 4 is laminated to the second web 5 in the space between rolls 2 and 3. The heating roll 2 serves to hold the metallic foil at the heat bonding temperature, and the press roll 3 serves to form a complete laminate free from voids by applying a rubber elastic pressure to the second web. The surface of the heating roll 2 is desirably heated to a temperature of at least about 140° C., and within the range from the melting or softening point of the second web or the adhesive agent to a temperature about 100° C. higher than the melting or softening point thereof. This is for the purpose of achieving the heat bonding of the first and second web. However, heating to more than about 350° C. is not so significant in practice.

The laminate 6 so formed is cooled by the cooling roll 17, and wound up by the take-up reel 19.

The method of this invention affords various advantages. For example, the adhesion strength among the layers of the resulting laminate is excellent, and in particular, the adhesion strength retention under hot water is excellent. Furthermore, when food is stored for a long period of time in a pouch produced from the resulting laminate after heat sterilization, the reduction in the adhesion strength among the layers of the laminate is small, and the phenomenon of spot-like peeling, which becomes a cause of pinholes, is reduced. Furthermore, the flavor of the contained food is maintained even after heat sterilization. Furthermore, according to the method of this invention, a flexible film such as a synthetic resin film can be laminated to a metal foil without generating longitudinal creases. When the laminate is printed, fluctuations in the pitch of printing are reduced.

Preheating for prevention of longitudinal creases and melting of the adhesive can be simultaneously performed by high frequency induction heating. Moreover, high-speed heating with a very high heat efficiency is possible.

The following Examples and Comparative Examples illustrate the present invention and its advantages more specifically.

The tests shown in these examples were performed as follows:

Laminate strength

A rectangular specimen, 15 mm wide, is cut from the laminate, and subjected to a 180° peel test by an Instron tensile tester at a tensile speed of 300 mm/min.

Flavor test

Pouches made of the laminate were filled with pure water, and subjected to a heat sterilization treatment at 135° C. for 10 minutes. The treated pure water was taken by 25 panelists to evaluate its taste and smell.

EXAMPLE 1

A printed polyethylene terephthalate film having a thickness of 12 microns was laminated to an aluminum foil having a thickness of 9 microns by means of a urethane adhesive.

A powder of maleic anhydride grafted polypropylene having a density of 0.90, an average particle diameter of 50 microns, a melt index (MI) of 30 g/10 min., an average carbonyl group concentration of 7 milliequivalents/100 g of polymer, and a melting point of 160° C. was coated at a rate of 2.0 g/m$^2$ by an electrostatic coating gun to the aluminum foil surface of the resulting laminate moving continuously at a speed of 10 m/min. The discharge pressure was 1.1 kg/cm$^2$, and the applied voltage was 90 kilovolts.

The high frequency voltage of a high-frequency induction heating coil disposed 1.5 cm away from the moving laminate was adjusted to 2.0 KV, and the aluminum foil of the laminate was heated for about 0.3 second from the side of the polyethylene terephthalate film. Thus, the powder was melted and bonded to the aluminum foil.

Then, a 70 micron-thick film of an ethylene/propylene block copolymer having a melting point of 158° C., a density of 0.90 g/cm$^3$, a melt index of 8.0 g/10 min. and an ethylene content of 5 mole% was contacted with the powder coated surface of the laminate. The assembly was bonded under a pressure of 6 kg/cm$^2$ between a hot roll having a diameter of 90 mm heated at 230° C., and a silicone rubber roll having a diameter of 90 mm, to laminate the polypropylene film to the laminate.

Then, the laminated structure was cooled to 20° C. by a cooling roll having a diameter of 190 mm. The resulting laminate was free from fluctuations in the pitch of printing, creases and curling.

The laminate strength between the aluminum foil and the polypropylene film was 700 g/15 mm width, and the laminate strength between the aluminum foil and the polyethylene terephthalate film was 520 g/15 mm width.

When the laminate was treated with heated steam at 135° C. for 10 minutes, there was no delamination among the individual layers of the laminate. After the treatment, the laminate strength between the aluminum foil and the polypropylene film was 650 g/15 width, and the laminate strength between the aluminum foil and the polyethylene terephthalate was 500 g/15 mm width.

Pouches having a size of 130 mm×170 mm were produced from the laminate, and were filled with water. The filled pouches were subjected to retort sterilization at 135° C. for 10 minutes. The water in the pouches was then subjected to the flavor test. The results are shown in Table 1.

"Instant" curry was filled in these pouches, and heat-sterilized at 135° C. for 10 minutes, and stored for three months. The proportion of pouches in which spot-like delamination occurred between the aluminum foil and the polypropylene film was 0.001% of the entire pouches tested.

COMPARATIVE EXAMPLE 1

The same modified polypropylene powder as used in Example 1 was dispersed in kerosene (b.p. 175° to 325° C.) to form a dispersion having a solids concentration of 15%. The dispersion was coated at the rate of 2.0 g/m$^2$ on the same laminate of the 12 micron-thick printed polyethylene terephthalate and the 9 micron-thick aluminum foil as used in Example 1 using a 120-mesh gravure cylinder. The coated laminate was passed through a hot air oven at 240° C. for 20 seconds to evaporate off the kerosene and melt the modified polypropylene. The same 70 micron-thick polypropylene film as used in Example 1 was heat-bonded to the laminate and cooled under the same conditions as in Example 1 to form a laminate. In the resulting laminate, the polyethylene terephthalate was in the stretched state, and the pitch of printing changed. It was difficult to produce pouches from the resulting laminate. Furthermore, longitudinal creases were seen to form in the laminate.

The laminate strength between the aluminum foil and the polypropylene film of this laminate, was 670 g/15 width, and the laminate strength between the aluminum foil and the polyethylene terephthalate film was 350 g/15 mm width.

When the laminate was exposed to hot steam at 135° C. for 10 minutes, delamination occurred between the aluminum foil and the polypropylene film at the portion of creases. The laminate strength between the aluminum foil and the polyethylene terephthalate film decreased to 105 g/15 mm width.

Pouches having a size of 130 mm×170 mm were produced from the resulting laminate, filled with 180 ml of water, and subjected to heat sterilization at 135° C. for 10 minutes. The water so heat-sterilized was subjected to the flavor test. The results are shown in Table 1.

"Instant" curry was packed into the pouches, heat sterilized at 135° C. for 10 minutes, and preserved for 3 months at 25° C. Those pouches in which spot-like delamination occurred between the aluminum foil and the polypropylene film accounted for 1% of the entire pouches tested.

TABLE 1

| Flavor test by a panel of 25 panelists | | |
| --- | --- | --- |
| Responses of the panelists | Example 1 | Comparative Example 1 |
| Very good | 20 | 0 |
| Good | 3 | 0 |
| Fair | 2 | 3 |
| Poor | 0 | 5 |
| Very poor | 0 | 17 |

EXAMPLE 2

A laminate was produced by using an apparatus of the type shown in FIG. 1.

A first web having a width of 460 mm was prepared by laminating a 12 micron-thick biaxially oriented polyethylene terephthalate film to a 9 micron-thick mild aluminum foil through an isocyanate-type adhesive. The first web was charged into unwinding reel 9 with the aluminum foil side facing downward. Tank 10 contained a powder with a particle diameter of about 10 to 50 microns of maleic anhydride-modified polypropylene (melting point 160° C.) dispersed in toluene.

Within tank 10, the modified polypropylene powder was coated at a rate of about 1 g/m² on the aluminum foil surface of the first web. The coated web was heated to about 100° C. in oven 14 to remove toluene. The running speed of the first web was 10 m/min.

The high frequency induction heating coil consisted of a copper pipe (water cooled) having a diameter of 6 mm and the configuration shown in FIGS. 2-a and 2-b. The total length (the distance between the tips 7c) was 460 mm, the length of the parallel portion (7a) was 380 mm, and the height of the perpendicular drawn from the tip 7c to the plane of the parallel portion was 18 mm. The width of the parallel portion was 30 mm. The distance between the first web and the parallel portion of the heating coil was set at 15 mm, and the distance between the lower parallel portion of the coil and the heating roll 2 was set at 10 cm. The heating coil was operated at an oscillation frequency of 400 kHz adjusting the anode input of a vacuum tube to 3 kw. As a result, the temperature of the aluminum foil of the first web could be uniformly and rapidly raised to 200° C. The temperature was measured by a thermopaint. The time which was required from the time when the first web was located at a position facing the lower conductor of the heating coil until it entered the space between rolls 2 and 3 was 0.6 second.

The modified polypropylene powder was melted, and a thin coating of polypropylene was formed on the aluminum foil. Through the resulting adhesive layer, a second web composed of a non-stretched polypropylene film having a thickness of 70 microns and a width of 460 mm was melt-bonded to the first web. The surface of the heating roll was maintained at a temperature of 180° C. The resulting flat laminate, completely free from longitudinal creases, was then cooled with a cooling roll, and taken up on a take-up reel.

The laminate was cut to a predetermined size, and retortable pouches were made by heat sealing the periphery of the cut pieces with the polypropylene side facing inwardly. When the retortable pouches were heat-sterilized at 135° C. for 10 minutes, delamination and other defects did not occur, and they were also hygienically superior.

For comparison, the heating in the above process was performed by means of an electric infrared heater placed above the press roll instead of high frequency heating. Heat was reflected by the aluminum foil, and the temperature of the first web rose only slightly and the modified polypropylene was not melted. Furthermore, considerable longitudinal creases occurred, and no satisfactory laminate could be obtained.

EXAMPLE 3

As a first web, a mild aluminum foil having a thickness of 15 microns and a width of 460 mm was used. As a second web, a biaxially oriented polyethylene terephthalate film (melting point 255° C.) having a thickness of 15 microns and a width of 460 mm was used. A polyester powder (particle diameter about 10 to 50 microns) was dispersed in ethyl acetate, and the dispersion was coated at a rate of about 1 g/m² as an adhesive.

The aluminum foil was heated to 270° C. by high frequency induction heating. The anode input of a vacuum tube was 5.5 kw. The surface temperature of the heating roll was set at 260° C. Otherwise, the same treatments as in Example 1 was performed. A flat laminate free from creases and composed of aluminum foil-polyethylene terephthalate film was produced.

What we claim is:

1. In a method for producing laminated packaging sheet materials which comprises continuously feeding a metal foil to a fixed traveling path, causing said foil to travel along said path, continuously applying an adhesive to one surface of the traveling foil at a definite point along said path, continuously feeding a synthetic resin film to the surface of the adhesive-coated foil at a point downstream from said point at which said adhesive is applied to said foil, and adhering said film to said foil via said adhesive, the improvement which comprises coating an adhesive synthetic resin powder having a particle diameter of 0.1 to 100 microns, either as such or as a dispersion in water or in an organic liquid having a boiling point of 50° to 112° C., on the surface of a metal foil having a thickness of 5-30 microns, the amount of said resin powder adhered to said foil surface being 0.1 to 10 g/m², heating the resin coating by high frequency induction with a high frequency induction heating coil arranged adjacent said path opposite the traveling foil but not being in contact with said foil, to melt said resin powder, thereby to bond said resin powder to said foil, superposing said synthetic resin film on the resulting molten coating, heating the resultant assembly under pressure, and cooling the heated assembly.

2. The method of claim 1 wherein the heating of the resultant assembly under pressure is carried out by a heat bonding roll assembly consisting of a heating roll, and a press roll whose surface is lined with elastic rubber.

3. The method of claim 1 wherein the metal foil is previously laminated to a plastic film.

4. The method of claim 1 or 3 wherein the coated synthetic resin powder is melted by heating for 0.1 to 10 seconds by high frequency induction heating.

5. The method of claim 4 wherein the dispersion of the adhesive synthetic resin powder is coated on the metal foil surface and the water or the organic liquid medium is evaporated in an oven, followed by high frequency induction heating.

6. The method of claim 5 wherein the high frequency induction heating is carried out by a high frequency induction heating coil which forms a closed circuit on one side of the metal foil.

* * * * *

UNITED STATES PATENT AND TRADEMARK OFFICE
CERTIFICATE OF CORRECTION

PATENT NO. : 4,552,605

DATED : November 12, 1985

INVENTOR(S) : Senji ITOH, Toshifumi TANABASHI, Kazuhisa ISHIBASHI

It is certified that error appears in the above-identified patent and that said Letters Patent is hereby corrected as shown below:

Column 7, line 37, change "There" to --These--;

Column 9, line 54, change "650 g/15 width" to --650 g/15mm width--; and

Column 10, line 23, change "670 g/15" to --670 g/15mm--.

Signed and Sealed this

Sixteenth Day of September 1986

[SEAL]

Attest:

DONALD J. QUIGG

Attesting Officer

Commissioner of Patents and Trademarks